(12) United States Patent
Danino et al.

(10) Patent No.: US 12,191,524 B2
(45) Date of Patent: Jan. 7, 2025

(54) DENDRITE GROWTH PREVENTION IN A RECHARGEABLE BATTERY

(71) Applicant: PHINERGY LTD., Kfar Sabba (IL)

(72) Inventors: Aviel Danino, Beit She'an (IL); Ilya Yakupov, Rehovot (IL)

(73) Assignee: PHINERGY LTD., Kfar Sabba (IL)

( * ) Notice: Subject to any disclaimer, the term of this patent is extended or adjusted under 35 U.S.C. 154(b) by 694 days.

(21) Appl. No.: 17/299,321

(22) PCT Filed: Dec. 3, 2019

(86) PCT No.: PCT/IL2019/051325
§ 371 (c)(1),
(2) Date: Jun. 3, 2021

(87) PCT Pub. No.: WO2020/115743
PCT Pub. Date: Jun. 11, 2020

(65) Prior Publication Data
US 2022/0029248 A1    Jan. 27, 2022

Related U.S. Application Data

(60) Provisional application No. 62/775,660, filed on Dec. 5, 2018.

(51) Int. Cl.
*H01M 50/497*    (2021.01)
*H01M 4/24*    (2006.01)
(Continued)

(52) U.S. Cl.
CPC ......... *H01M 50/497* (2021.01); *H01M 4/244* (2013.01); *H01M 10/28* (2013.01);
(Continued)

(58) Field of Classification Search
CPC ......... H01M 4/244; H01M 2300/0014; H01M 50/489; H01M 50/491; H01M 50/494; H01M 50/497; H01M 50/463
See application file for complete search history.

(56) References Cited

U.S. PATENT DOCUMENTS 4,539,277 A    9/1985    Ishigaki et al.
4,592,973 A    6/1986    Pemsler
(Continued)

FOREIGN PATENT DOCUMENTS

CN    103748738    11/2016
CN    106410291    2/2017
(Continued)

OTHER PUBLICATIONS

Search Report dated Nov. 24, 2022 for European application No. 19891957.3.
(Continued)

*Primary Examiner* — Christopher P Domone
(74) *Attorney, Agent, or Firm* — PEARL COHEN ZEDEK LATZER BARATZ LLP

(57) ABSTRACT

Rechargeable batteries and corresponding methods are provided, in which zinc dendrite growth to a compartment between a zinc-based anode and a separator of a rechargeable battery is limited, by preventing zincate anions from diffusing outside of the compartment. Separators limiting dendrite growth may comprise ion-selective membrane(s) configured to be permeable to charge transfer cations of the alkaline electrolyte and impermeable to hydrated zincate anions. The membrane(s) may be reinforced and/or support internal compartment(s) with electrolyte lacking zincate ions. More generally, separators are provided, which are permeable to charge transfer ions but impermeable to metal ions, and limit the latter to the anode compartment in which the metal ions may be deposited in a manner that does not (Continued)

form dendrites which can compromise the structural and functional integrity of the battery cell.

12 Claims, 2 Drawing Sheets

(51) Int. Cl.
  *H01M 10/28* (2006.01)
  *H01M 50/409* (2021.01)
  *H01M 50/429* (2021.01)

(52) U.S. Cl.
  CPC ....... *H01M 50/409* (2021.01); *H01M 50/429* (2021.01); *H01M 2300/0014* (2013.01)

(56) References Cited

U.S. PATENT DOCUMENTS

| | | |
|---|---|---|
| 10,020,480 B2 | 7/2018 | Fujisaki et al. |
| 2012/0321970 A1 | 12/2012 | Friesen |
| 2018/0175354 A1 | 6/2018 | Tokushima et al. |
| 2018/0316063 A1* | 11/2018 | Masel ................ H01M 50/489 |
| 2019/0088915 A1* | 3/2019 | Huang ................ H01M 4/244 |
| 2021/0399305 A1* | 12/2021 | Huang ................ H01M 50/457 |

FOREIGN PATENT DOCUMENTS

| | | |
|---|---|---|
| CN | 104662705 | 12/2017 |
| CN | 107636861 | 1/2018 |
| CN | 106165154 | 3/2020 |
| EP | 3041080 | 7/2016 |
| GB | 1226156 | 3/1971 |
| JP | S55-024657 | 2/1980 |
| JP | H0722028 | 1/1995 |
| JP | H11-096990 | 4/1999 |
| JP | 2015-005493 | 1/2015 |
| JP | 2016-194990 | 11/2016 |
| JP | 2020-518964 | 6/2020 |

OTHER PUBLICATIONS

Kohei Miyazaki et al; Suppression of Dendrite Formation of Zinc Electrodes by the Modification of Anion-Exchange Ionomer; The Electrochemical Society of Japan; Oct. 5, 2012.
International Search Report dated Feb. 26, 2020 for corresponding PCT Application No. PCT/IL2019/051325.
Office Action dated Jan. 2, 2023 for Indian Patent Application No. 202117027666.
Office Action dated Jan. 18, 2023 for Chinese Patent Application No. 2019800853306.

* cited by examiner

DENDRITE GROWTH PREVENTION IN A RECHARGEABLE BATTERY

CROSS-REFERENCE TO RELATED APPLICATIONS

This application is a National Phase Application of PCT International Application No. PCT/IL2019/051325, International Filing Date Dec. 3, 2019, claiming the benefit of U.S. Patent Application No. 62/775,660, filed Dec. 5, 2018 which is hereby incorporated by reference.

BACKGROUND OF THE INVENTION

1. Technical Field

The present invention relates to the field of batteries, and more particularly, to systems and methods that restrict or prevent dendrite growth.

2. Discussion of Related Art

Rechargeable batteries with metal-based anodes suffer often from dendrite growth upon charging, which poses performance and safety issues that prevent wide-spread use thereof.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a rechargeable battery comprising at least one metal-based anode, at least one cathode, alkaline electrolyte and at least one separator separating the at least one anode from the at least one cathode, wherein the separator comprises an ion-selective membrane permeable to charge transfer cations of the alkaline electrolyte and impermeable to metal ions.

In another aspect, the invention is a rechargeable battery comprising a zinc-based anode, a cathode, an alkaline electrolyte and a separator separating the zinc-based anode from the cathode, wherein the separator comprises an ion-selective membrane configured to be permeable to charge transfer cations of the alkaline electrolyte and impermeable to hydrated zincate anions.

In another aspect, the invention is a method for limiting zinc dendrite growth in a rechargeable battery, said rechargeable battery having a zinc-based anode, a cathode and an alkaline electrolyte, wherein the method comprises providing a separator comprising an ion-selective membrane permeable to charge transfer cations of the alkaline electrolyte of the rechargeable battery and impermeable to hydrated zincate anions, and forming a compartment with the separator in the alkaline electrolyte, between the zinc-based anode and the cathode.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
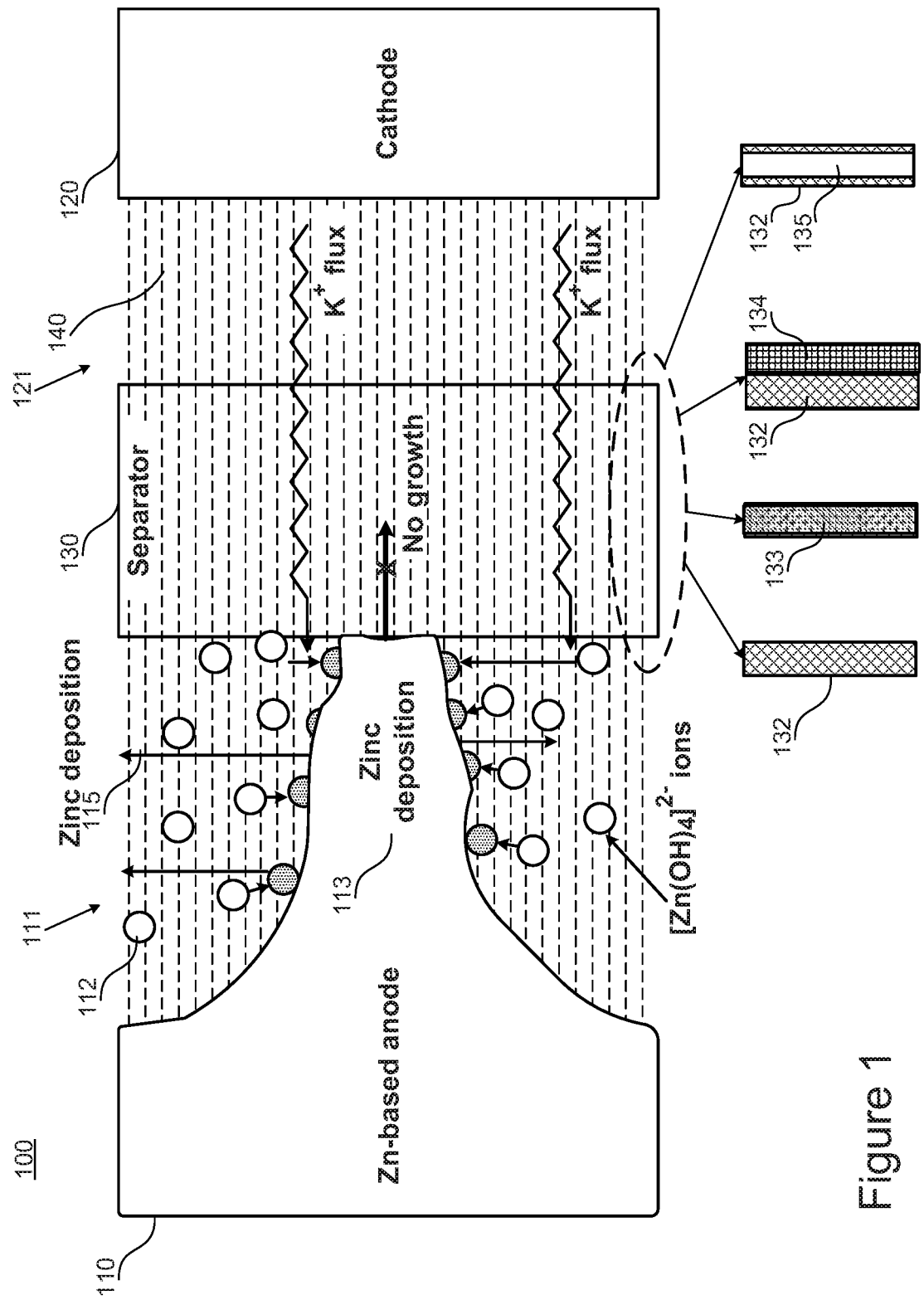
FIG. 1 is a high-level schematic illustration of a rechargeable battery, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for improving the safety and performance of rechargeable batteries such as zinc-based batteries, and thereby provide improvements to the technological field of energy storage. Rechargeable batteries and corresponding methods are provided, in which zinc dendrite growth is limited to a compartment between a zinc-based anode and a separator of a rechargeable battery by preventing zincate anions from diffusing outside of the compartment, for example by positioning the separator to prevent the movement of the zincate ions by diffusion. Separators limiting dendrite growth may comprise ion-selective membrane(s) configured to be permeable to charge transfer cations of the alkaline electrolyte and impermeable to hydrated zincate anions. The membrane(s) may be reinforced and/or may provide a boundary of and may support internal compartment(s) with electrolyte lacking zincate ions. More generally, in various embodiments separators are provided, which are permeable to charge transfer ions but impermeable to metal ions, and limit the latter to the anode compartment in which the metal ions may be deposited in a manner that does not form dendrites which can compromise the structural and functional integrity of the battery cell.

The batteries may comprise ion-exchange membrane(s) placed between the anode(s) and the cathode(s) of the cell, that provide high-performance and longer cycle life for the battery. For example, disclosed batteries may be used in electric vehicles. Advantageously, disclosed embodiments overcome dendrite growth and enable use of rechargeable zinc-based batteries, which are currently not widely used due to dendrite growth and related safety and lifetime issues. This inherent problem of rechargeable metal anodes originates from the fact that during cycles of battery discharging and charging, the anode's metal repeatedly dissociates and is restored. During discharge, the metal of the anode "disappears", converts into soluble ions or insoluble oxidized compounds, while during charging, the metal is "restored" when it is reduced back from metal ions to metal. This metal reduction is similar to the process of metal plating in an electroplating bath. In the prior art, the metal reduction cycles in the battery occur at conditions which are usually not favorable to the formation of a solid dense metal layer. Instead, the result of the reduction process is that the flat surface of the metal anode after several cycles of discharge/charge quickly develops roughness, and local irregularities quickly morph into dendritic metal crystals, "dendrites", propagating in the direction of the opposite electrode (cathode). Growing dendrites can punch battery separators and cause internal short circuits, which affect battery effective capacity and cycling life. Internal shorts are also a major safety concern in the field of rechargeable batteries.

The following disclosure provides cells which overcome the prior art barrier of dendrite growth and extends the lifetime of rechargeable batteries, especially of zinc-based batteries.

FIG. 1 is a high-level schematic illustration of a rechargeable battery 100, according to some embodiments of the invention. Rechargeable battery 100 comprises a zinc-based anode 110, a cathode 120, an alkaline electrolyte 140 and a separator 130 separating zinc-based anode 110 from cathode 120. Separator 130 separates the internal space of the cell into an anode compartment 111 comprising electrolyte 140 in contact with anode 110, and a cathode compartment 121 comprising electrolyte 140 in contact with anode 120. Separator 130 comprises an ion-selective membrane 132 permeable to charge transfer cations (e.g., $K^+$) of alkaline electrolyte 140 (e.g., KOH) and impermeable to hydrated zincate anions $Zn(OH)_4^{2-}$ 112. The inventors have found out that as zincate ions 112 contribute to dendrite growth, placing a barrier to the zincate ions, in the form of ion-selective membrane 132, advantageously prevents dendrite growth through separator 130 and into cathode compartment 121, and limits zinc deposition 115 to anode compartment 111. Therefore, separator 130 is configured to limit zinc dendrite growth to compartment 111 between zinc-based anode 110 and separator 130 by preventing zincate anions 112 from diffusing outside of compartment 111. While zinc may be deposited on anode 110 as part of the charging process, only initial dendrite structures 113 may be formed thereupon and further zinc deposition is prevented from forming dendrites that risk the cell's structural integrity.

In various embodiments, ion-selective membrane 132 may be selected from membranes known in the art for this purpose, including polymer-based films such as a cellophane membrane, a thin-film composite membrane and/or an asymmetric reverse osmosis membrane. In various embodiments, separator 130 may be mechanically reinforced, e.g., with fibrous polymer which may be integrated with ion-selective membrane 132 (shown as combined layer 133 in FIG. 1) and/or separator 130 may comprise a layer 134 of fibrous polymer attached to or adjacent to ion-selective membrane 132 (which may further be internally reinforced as layer 133), that forms a mechanical support 134 of separator 130. In certain embodiments, ion-selective membrane 132 may be charge selective, letting cations through and not letting anions through. In certain embodiments, separator 130 may be configured to support at least one internal compartment 135 with electrolyte 140 that is substantially depleted in, or devoid of, zincate ions. For example, internal compartment(s) 135 may be in fluid communication with compartments in cell 100 and/or an external source of electrolyte (not shown) that hold electrolyte 140 that is devoid of zincate ions, i.e., contains no zincate ions or at most negligible amounts.

It is noted that similar construction principles are applicable to other types of batteries, as long as the charge transfer ions (in the example above, potassium) are different from the ions of the active metal (in the example above, zinc). In such cases, separator 130 and/or ion-selective membrane 132 may be selected to be permeable to the former but impermeable to the latter, limiting potential dendrite growth to anode compartment 111.

Certain embodiments are applicable to batteries with metal-based anodes, in which, during charging, metal is reduced on the anode, producing a newly formed metal deposit. In the case where the metal ions are present in a complex ion (e.g., metal hydroxide), a product of the reduction of the metal ion is released into the electrolyte bulk. For example, in the case of a rechargeable alkaline zinc-based battery, the zinc anode charging process can be described as follows $[Zn(OH)_4]^{2-}+2e-\rightarrow[Zn]^0+4(OH)^-$, with the metal ion ($Zn^{2+}$) present in a zincate ($[Zn(OH)_4]^{2-}$) anion, which decomposes on the anode, producing zinc metal and releasing four hydroxyl anions into the electrolyte.

Disclosed separators 130 prevent deposition of the metal ion on the metal anode beyond anode compartment 111 and thereby limit dendrite growth. It is noted that disclosed embodiments are applicable to batteries in which the charge transfer ions are different from the metal ions, for example, in the illustrated case, potassium cations ($K^+$) from electrolyte 140 are the charge transfer ions that are not limited to anode compartment 111, while the zincate ions are the metal ions which are limited to anode compartment 111 without compromising the charge transfer capability of cells 100. It is noted that the current invention is not applicable to batteries in which the metal ion is also the charge transfer ion, such as Li-ion batteries.

In various embodiments, separator 130 is permeable to the charge transfer species and impermeable to the metal ions that form the dendrites (for example, in the rechargeable alkaline zinc battery, the alkali cation is the charge transfer species, while the zincate-ion is the metal ion). Separator 130 confines the metal ions to anode compartment 111 and prevents metal deposition beyond the limits of anode compartment 111—to prevent dendrite growth. For example, as the zincate ions are not available in electrolyte 140 beyond anode compartment 111—no further dendrite growth is possible. In particular embodiments, metal-free zone(s) form in the proximity of cathode 120 to minimize the probability of metal expansion into direct contact with cathode 120 and prevent battery short circuit. Observing zinc deposition 113 on the micro-level, the inventors note that the tip of a growing Zn protrusion 113 stops growing by further zinc deposition when reaching separator 130 (indicated schematically by a crossed arrow) and continues to grow to the sides, transversely, or tangent with respect to the surface of separator 130 (indicated schematically by arrow 115) and does not continue to propagate through the separator membrane toward cathode 120, because zincate ions needed for metal deposition (and dendrite propagation) are only available on the sides of the dendrite, and are not available in the direction perpendicular to the electrode surface, in the separator compartment 135 (optional), and cathode compartment 121, respectively.

In various embodiments, rechargeable batteries 100 are provided, which comprise at least one metal-based anode 110, at least one cathode 120, alkaline electrolyte 140 and at least one separator 130 separating anode(s) 110 from cathode(s), wherein separator(s) 130 comprise an ion-selective membrane configured to be permeable to charge transfer cations of alkaline electrolyte 140 and impermeable to metal ions 112. Separator(s) 130 may be further configured to limit deposition of metal ions 112 to compartment(s) 111 between anode(s) 110 and separator(s) 130 by preventing metal ions 112 from diffusing outside of compartment(s) 111. The ion-selective membrane may comprise any of cellophane membrane(s), thin-film composite membrane(s) and asymmetric reverse osmosis membrane(s) and may be mechanically reinforced with any of fibrous polymer(s) or layers thereof, and/or other mechanical support(s).

Separators 130 may comprise one or more of a cation exchange membrane, a cation selective membrane, a semipermeable membrane, a size-selective membrane, a charge selective membrane or any combination thereof. In some embodiments, cation-selective membranes are permeable to cations (such as charge transfer ions in certain embodiments) only and not permeable to anions (such as metal ions in certain embodiments). In the example of the zinc-based battery, negative zincate anions cannot be transferred through the membrane while positive ions such as $Na^+$ or $K^+$ may be transferred through the membrane. In some embodiments, size-selective membranes transfer smaller alkali cations such as sodium or potassium and do not transfer larger zincate anions or zinc cations across the membrane. In various embodiments, the membrane of separator 130 may be selective with respect to ion size, ion charge, or both charge and size of the ions. In certain embodiments, the cation size may refer to the cation itself or to a solvated cation (with the cation size denoting the size of the cation surrounded by water molecules).

Figure 2:
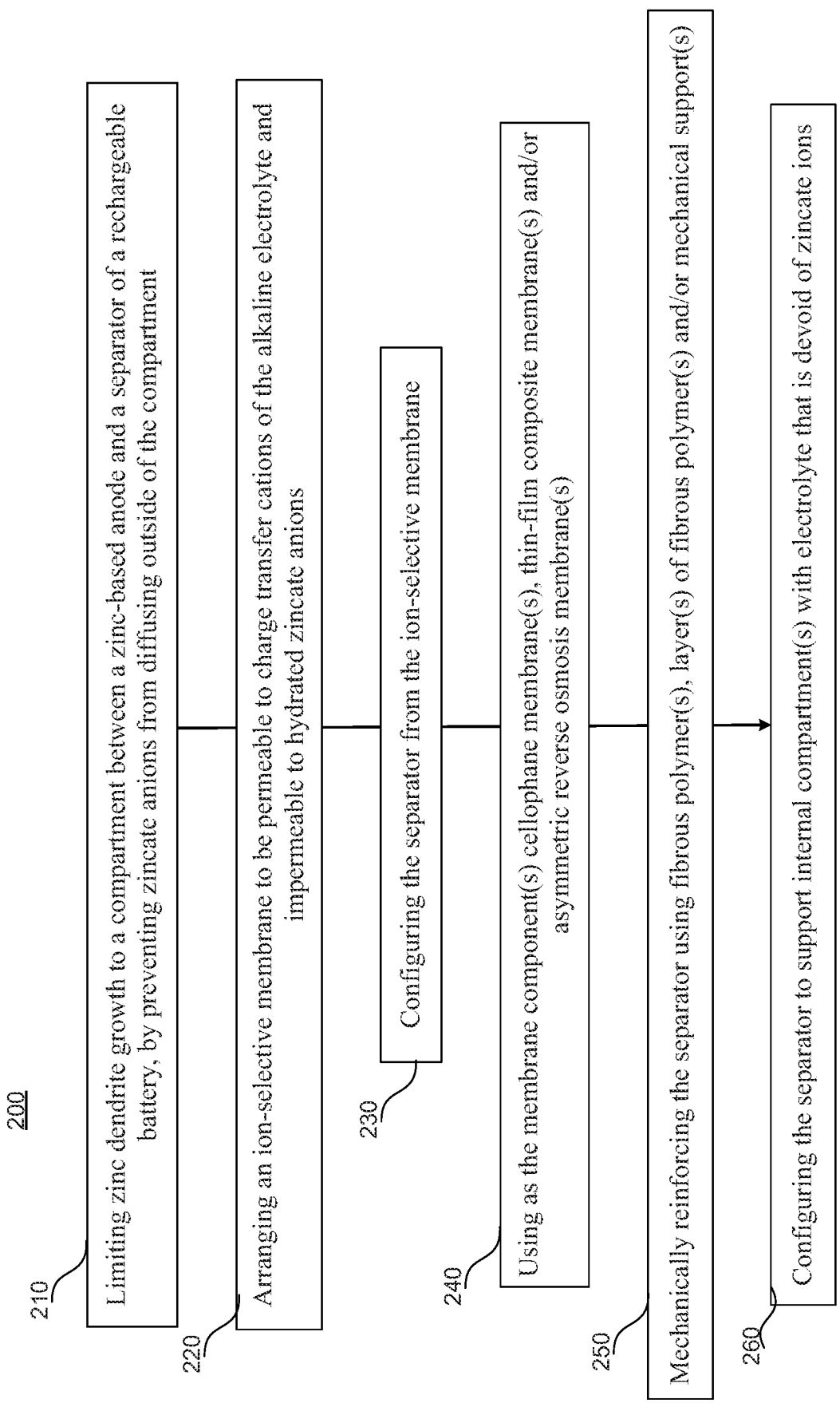
FIG. 2 is a high-level flowchart illustrating a method, according to some embodiments of the invention.

FIG. 2 is a high-level flowchart illustrating a method 200, according to some embodiments of the invention. The method stages may be carried out with respect to rechargeable batteries 100 and separators 130 described above, which may optionally be configured to implement method 200. Method 200 may comprise the following stages, irrespective of their order.

Method 200 comprising limiting zinc dendrite growth to a compartment between a zinc-based anode and a separator of a rechargeable battery, by preventing zincate anions from diffusing outside of said compartment (stage 210).

In certain embodiments, method 200 may comprise arranging an ion-selective membrane to be permeable to charge transfer cations of an alkaline electrolyte of the rechargeable battery, and impermeable to hydrated zincate anions (stage 220), and configuring, from the ion-selective membrane, the separator which separates, in the alkaline electrolyte, the zinc-based anode from a cathode of the rechargeable battery (stage 230). Arranging of the membrane 220 may comprise using as membrane component(s) cellophane membrane(s), thin-film composite membrane(s) and/or asymmetric reverse osmosis membrane(s) (stage 240). Method 200 may further comprise mechanically reinforcing the separator using fibrous polymer(s), layer(s) of fibrous polymer and/or other mechanical support(s) (stage 250).

In certain embodiments, method 200 may further comprise configuring the separator to support at least one internal compartment with electrolyte that is devoid of zincate ions (stage 260).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are the meanings that would be ascribed to such terms by one of ordinary skill in the art to which the invention pertains, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A rechargeable battery comprising a zinc-based anode, a cathode, an alkaline electrolyte and a separator separating the zinc-based anode from the cathode,
    wherein the separator comprises a cation-exchange membrane configured to be permeable to charge transfer cations of the alkaline electrolyte and impermeable to hydrated zincate anions,
    wherein the separator is configured to support an internal compartment with electrolyte that is devoid of zincate anions and is in fluid communication with an external source of electrolyte, and
    wherein the separator is further configured to prevent zinc dendrite growth into the internal compartment.

2. The rechargeable battery of claim 1, wherein the cation-exchange membrane is a thin-film composite membrane.

3. The rechargeable battery of claim 1, wherein the separator is mechanically reinforced.

4. The rechargeable battery of claim 3, wherein the separator is reinforced with fibrous polymer.

5. The rechargeable battery of claim 3, wherein the separator comprises a layer of fibrous polymer.

6. The rechargeable battery of claim 3, wherein the separator comprises a mechanical support.

7. A method of preventing zinc dendrite growth in a rechargeable battery, the method comprising;
   separating a zinc-based anode from a cathode of the battery by a separator that comprises a cation exchange membrane configured to be permeable to charge transfer cations of an alkaline electrolyte of the rechargeable battery, and impermeable to hydrated zincate anions, and
   providing an internal compartment supported by the separator in said rechargeable battery, which is devoid of zincate ions, wherein the cation exchange membrane is configured to prevent zincate anions from diffusing into said internal compartment,
   wherein the internal compartment is in fluid communication with an external source of electrolyte.

8. The method of claim 7, wherein the cation exchange membrane comprises a thin-film composite membrane.

9. The method of claim 7, further comprising mechanically reinforcing the separator using at least one of: fibrous polymer, a layer of fibrous polymer and a mechanical support.

10. A rechargeable battery comprising at least one zinc based anode, at least one cathode, alkaline electrolyte and at least one separator separating the at least one anode from the at least one cathode, wherein the separator comprises a cation-exchange membrane configured to be permeable to charge transfer cations of the alkaline electrolyte,
    wherein the separator is configured to support an internal compartment with electrolyte that is devoid of zincate anions and is in fluid communication with an external source of electrolyte, and
    wherein the separator is further configured to prevent zinc dendrite growth into the internal compartment.

11. The rechargeable battery of claim 10, wherein the cation-exchange membrane comprises a thin-film composite membrane.

12. The rechargeable battery of claim 10, wherein the separator is mechanically reinforced with at least one of: fibrous polymer, a layer of fibrous polymer and a mechanical support.

* * * * *